United States Patent [19]

Tarnowski

[11] Patent Number: 4,486,761
[45] Date of Patent: Dec. 4, 1984

[54] PARTICLE BEAM RECORDER SYSTEM HAVING A REFERENCING MEANS FOR ESTABLISHING REGISTRATION HOLES IN A FILM SUBSTRATE

[75] Inventor: Andrew A. Tarnowski, New Caanan, Conn.

[73] Assignee: Image Graphics, Incorporated, Fairfield, Conn.

[21] Appl. No.: 388,085

[22] Filed: Jun. 14, 1982

[51] Int. Cl.³ .............................................. G01D 15/06
[52] U.S. Cl. ................................. 346/161; 346/110 V
[58] Field of Search ................. 346/1.1, 110 R, 110 V, 346/158, 161

[56] References Cited

U.S. PATENT DOCUMENTS

| | | | |
|---|---|---|---|
| 2,976,354 | 3/1961 | Banning, Jr. et al. | 346/161 X |
| 2,984,535 | 5/1961 | Traite | 346/161 |
| 4,300,147 | 11/1981 | Tarnowski | 346/158 |

Primary Examiner—Thomas H. Tarcza
Attorney, Agent, or Firm—Roland T. Bryan

[57] ABSTRACT

An improved particle beam recorder system is provided having a film gate which includes a referencing means for providing at least two differently shaped registration holes in a recording film substrate. The referencing means lock in, secure, and define the film position relative to a film receiving surface of a film gate during exposure imaging and thereby establish a defined relation between the image field and the film substrate and more particularly the registration holes thereof. The developed film image can thereafter be positioned in a predefined or desired relationship in a display means by aligning the registration holes of the film with suitable pegs of the display means. The registration holes also advantageously permit the images of exposed and developed films to be aligned relative to one another to permit accurate superimposition.

The referencing means for producing the registration holes can be punch means which pierce the film. The punches are activated by a motor driven cam and controlled by an interlock circuit which disables the cam motor and the film advance motor during film exposure imaging. The referencing or punch means can be utilized in extended position during film exposure to secure the position of the film relative to the film gate.

10 Claims, 10 Drawing Figures

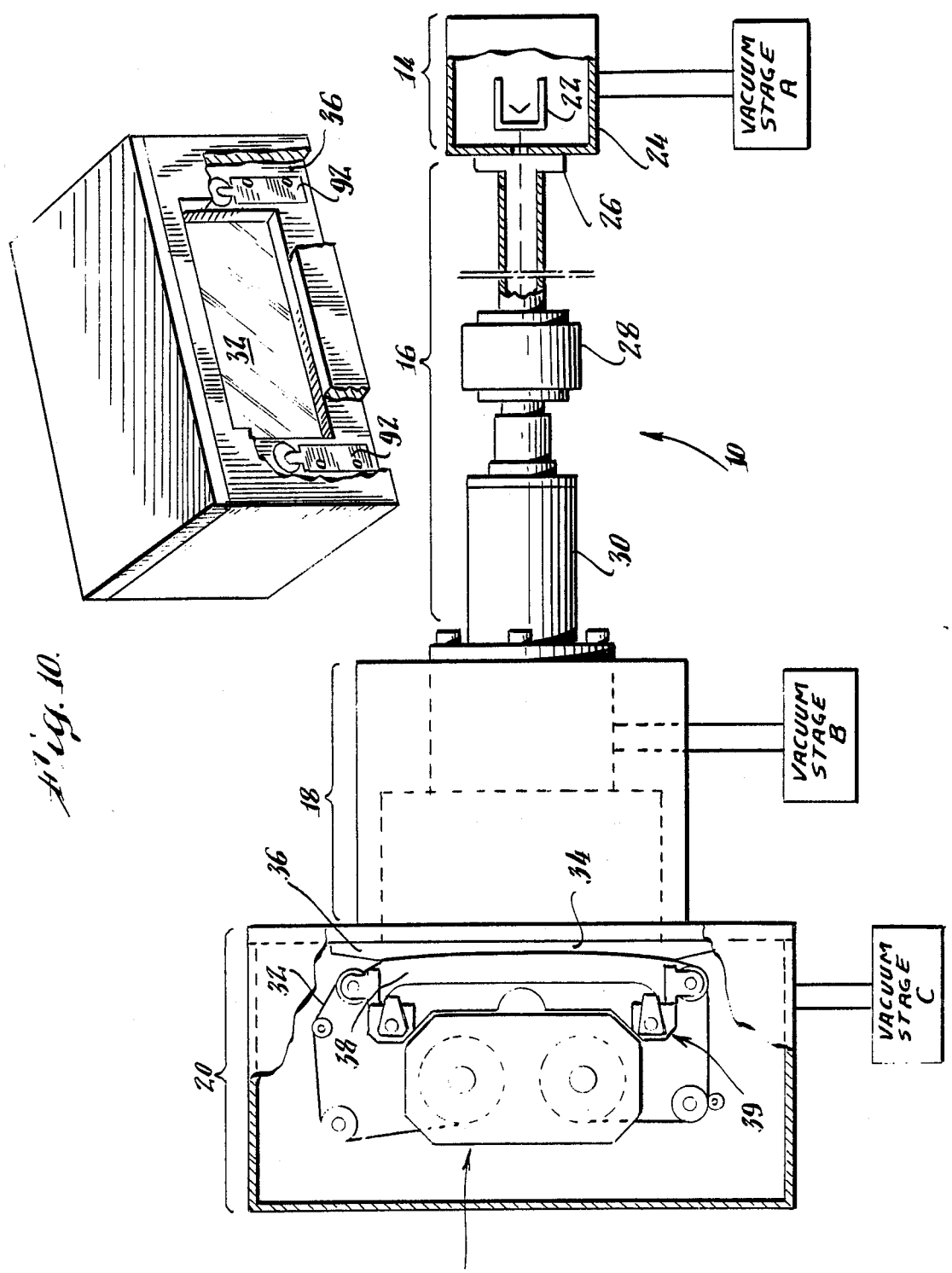

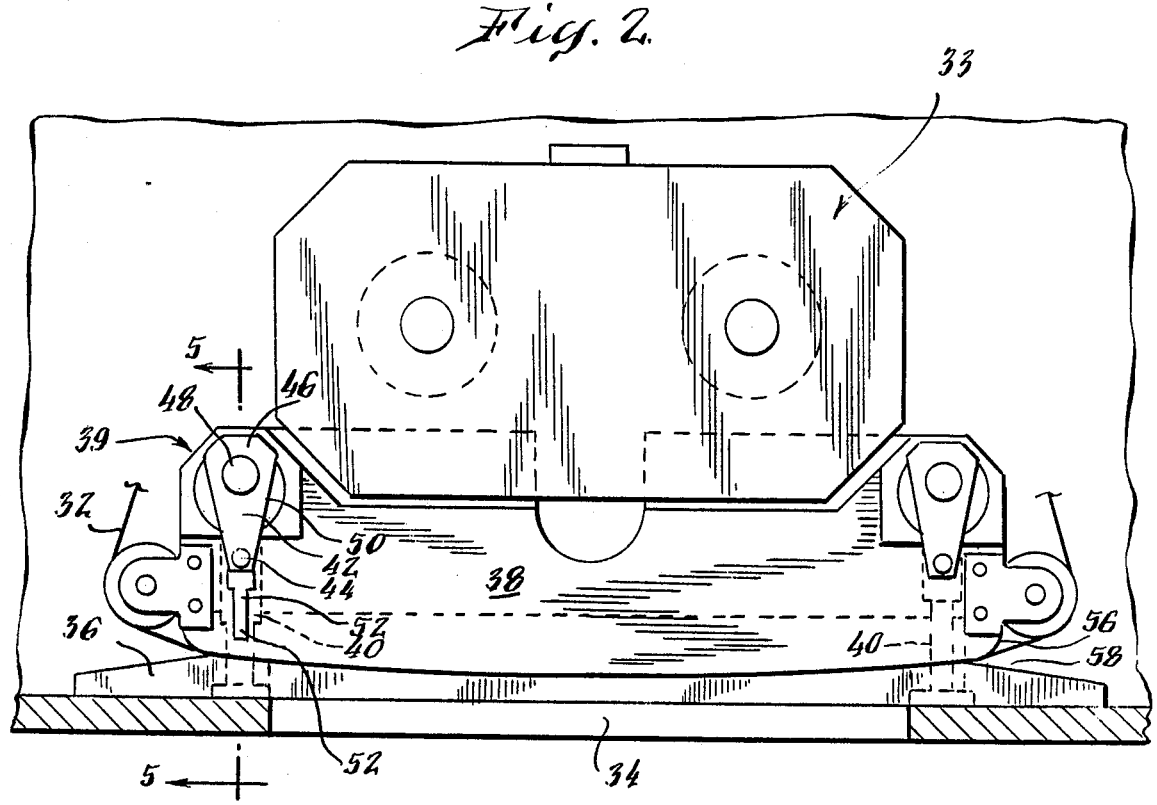
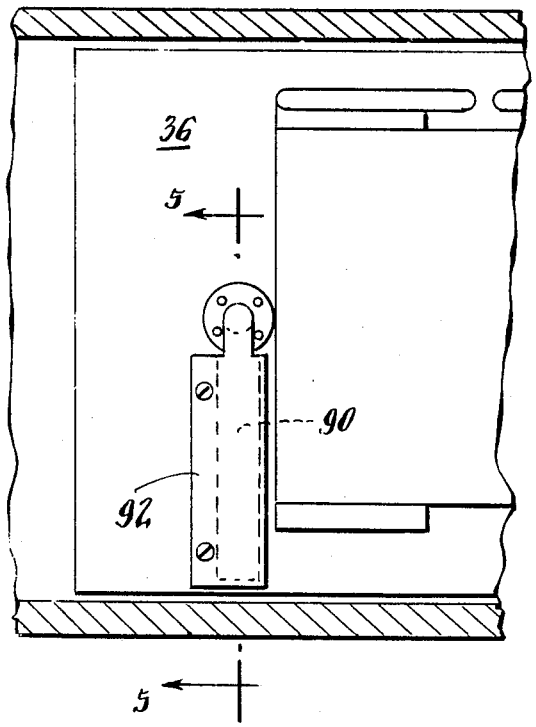
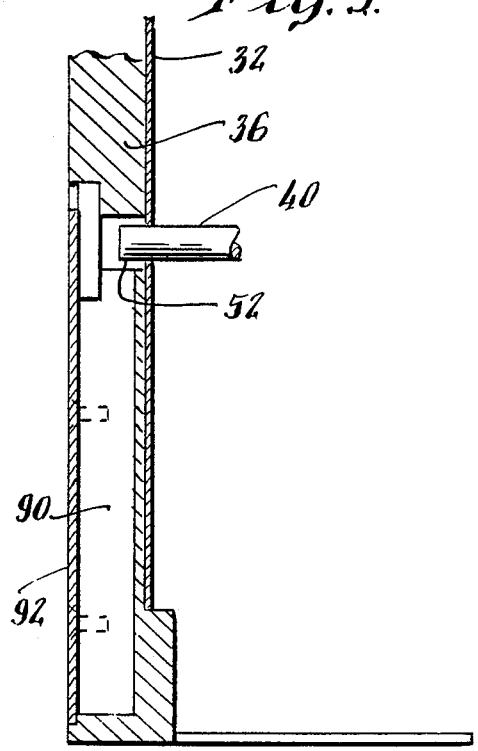

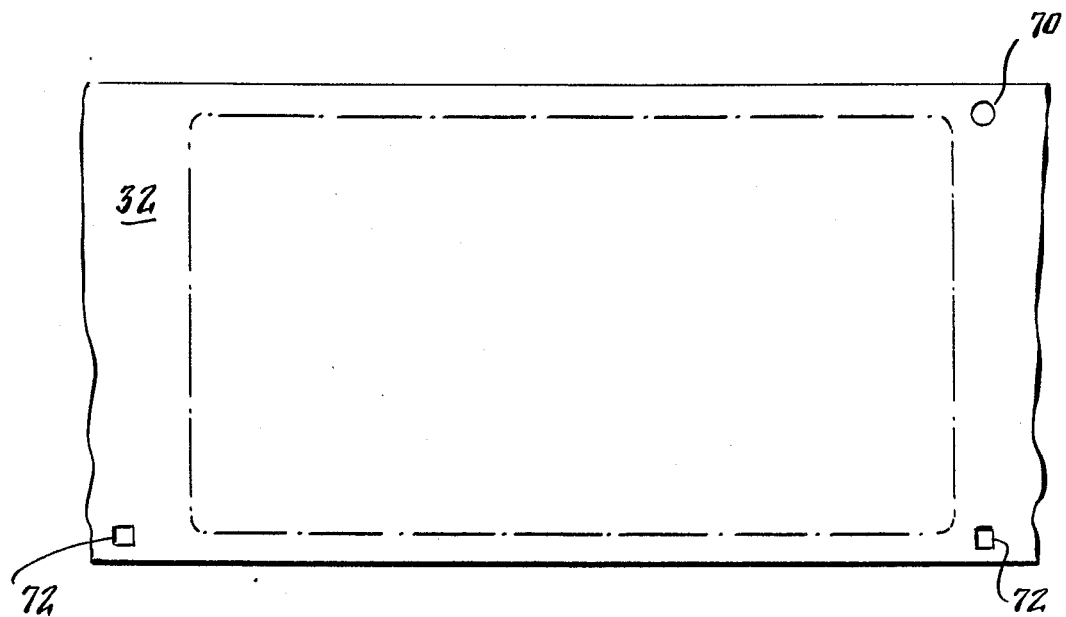
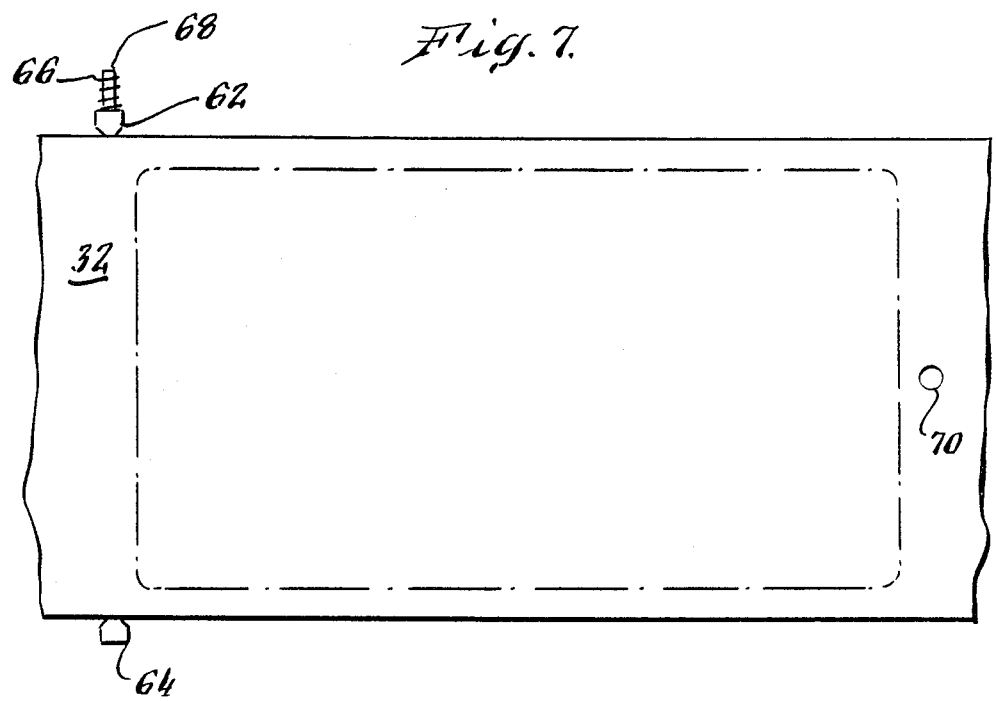

PARTICLE BEAM RECORDER SYSTEM HAVING A REFERENCING MEANS FOR ESTABLISHING REGISTRATION HOLES IN A FILM SUBSTRATE

CROSS REFERENCES

This invention relates to charged particle beam recorders (EBRs) which, for example, are disclosed in copending U.S. patent applications: System For Accurately Tracing With A Charged Particle Beam On A Film, Ser. No. 023,548, filed Mar. 26, 1979, now U.S. Pat. No. 4,300,147; and An Improved System And Film Gate For Accurately Imaging Information On A Film By A Charged Particle Beam, Ser. No. 279,834, filed July 2, 1981, now U.S. Pat. No. 4,455.563 the disclosures of which are expressly incorporated by reference herein.

FIELD OF THE INVENTION

Charged particle beam recording systems image information on a charge particle sensitive film by tracing lines or plotting points in prespecified positions on the film. The film, once developed, contains an image of the information which has been plotted or traced. These systems find particular utility in the graphic recording industry and are especially useful for, among other things, seismic recordings, television recording, computer output microfilms (COM), mass data storage, wide bandwidth signal recording, satellite photography, automated cartography, and computer micrographics.

BACKGROUND OF THE INVENTION

Positional uncertainties of the recording film are the serious limitations to the geometric accuracy of images recorded in high performance EBRs. One cause of positional uncertainty has been that prior films have been provided with edge perforations or gear slots to permit a gear driven film advance. These edge perforations are formed in the film at the time of manufacture. The accuracy with which these perforated films can be positioned is particularly limited by the degree to which the gear teeth accurately engage the perforations. A cause of misalignment is that charged particle recording films are subject to expansion and contraction due to changes in atmospheric conditions and as a result of film handling and processing. Accordingly, the peforation spacing can change while the gear teeth spacing remains constant. Thus, there is a definite need in the art for means which can accurately reference film and the image applied thereto where the accuracy of said means is not substantially impaired by expansion or contraction of the film.

Although prior film referencing means have been provided, none has overcome the problems associated with film expansion and contraction and the impairment of the accuracy of the reference means in EBR's. Although prior EBR systems provided by the inventor have employed film punches for piercing reference holes in the perimeter of the image field, these reference holes, after film expansion or contraction, often do not match up with the display means alignment peg and consequently the film can buckle with the resultant distortion to the film image. In some cases the nonalignment will cause the image reference holes to be damaged.

SUMMARY OF THE INVENTION

The present invention overcomes the problem of the prior art by providing a film referencing means which establishes at least two registration holes in the film substrate at the time of imaging. Alternatively, suitable film referencing may be accomplished with one registration hole in conjunction with edge guides. The registration holes make the film substantially immune to the effects of atmospheric changes and film processing and handling which cause shrinkage or expansion, and enable the film image to be accurately positioned by alignment of the registration holes. The registration holes are applied to the film after the film has been accurately positioned in the film gate. The registration holes are thus representative of the film position during recording and are useful to positionally reference the image applied thereto. Thus the reference holes provide a means for positioning exposed film frames relative to one another. More particularly, the referencing means thus accommodate those expansions and contractions which can occur after the film has been imaged.

Advantageously, the reference holes can be placed in the film by punches which individually pierce a film stationarily positioned within a film gate and cut and remove a portion of the film therefrom. The punches are operated by drive arms which are operated by the eccentricities of a motor driven cam. The cam motor is deactivated by an interlock system during film exposure and imaging. The interlock system can additionally deactivate the film transport mechanism.

In a preferred system employing two punches, it is preferred that the reference punches which cut the reference holes be of different shapes. In this manner additional opening space is provided in one dimension which can thereby accommodate the display means film receiving peg which otherwise would not have fit due to a slight expansion or contraction of the film between exposure and display.

Advantageously, the system of the present invention employs two punches disposed on opposite sides of the film. In another embodiment, three punches are disposed for piercing reference holes in the film. In yet another embodiment, referencing is provided by one registration hole in conjunction with edge guides.

The film frame is also provided with a magazine for collecting the film pieces cut by the punches to thereby avoid contaminating the recorder vacuum atmosphere.

Further objects and features and a more complete understanding of the embodiment of the present invention will be apparent from the following detailed description which taken in conjunction with the attached drawings represents the preferred embodiment of this invention.

BRIEF DESCRIPTION OF THE DRAWINGS

In the attached drawings, FIG. 1 is a top view, partially in cross section of the charged particle beam recorder system of the present invention.

FIG. 2 is an enlarged top view of the film gate and supply means of FIG. 1.

FIG. 6 is a plan view of a film with a first standard size round reference hole and second and third square reference holes.

FIG. 7 is a plan view of a film with a first standard size reference hole and a film edge guide means.

FIG. 8 is a front view of the film frame of FIG. 1, illustrating the film magazine.

FIG. 9 is a cross sectional view of the film frame of FIG. 1 illustrating the punch guide and the cut film magazine.

FIG. 10 is a perspective of stage C of the charged particle beam recorder with parts broken away illustrating the film magazine.

DETAILED DESCRIPTION

Figure 3:
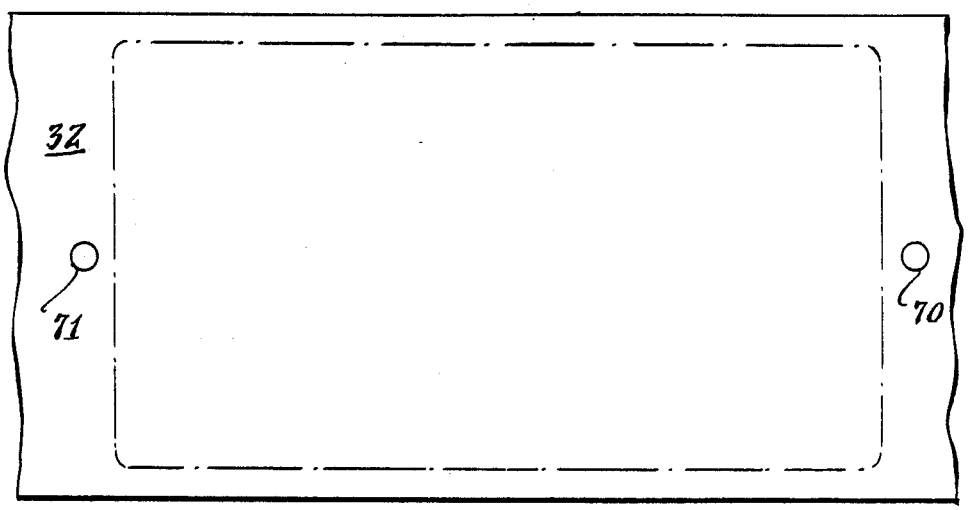
FIG. 3 is a plan view of a prior art film provided by the inventor, with two standard size round reference holes located at opposite ends of the image field.

In accordance with the disclosure of the preferred embodiment of this invention, it is intended that FIG. 1, illustrate a preferred embodiment of a complete charged particle beam recorder system generally designated 10. The complete electron beam recorder (EBR) includes a vacuum housing which can be divided into four volumes 14, 16, 18 and 20. Section 14 is reduced to a high vacuum atmosphere by vacuum stage A (for instance $10^{-7}$ Torr); volumes 16 and 18 are reduced to lesser vacuum atmosphere by vacuum stage B (for instance $10^{-5}$ Torr); and volume 20 is reduced to a still lesser vacuum atmosphere by vacuum stage C (for instance $10^{-1}$ Torr). The vacuum atmosphere produced by vacuum stages A, B and C can be established by any suitable means such as conventional vacuum pumps.

A charged particle recording beam is produced in the high vacuum volume 14 by a charged particle emitter 22 such as a conventional high resolution triode electron gun 2 having a directly heated thermionic emitter contained therein. High vacuum volume 14 is separated from the lesser vacuum volume 16 by a partition wall 24 having a small beam aperture therethrough. The vacuum section 16, in the preferred embodiment, provides for electromagnetic control of the beam by three electromagnetic coils 26, 28, and 30 which at least partially surround the beam path through the vacuum volume 16. The electromagnetic coils 26 and 28 focus the beam while the electromagnetic coil 30 deflects the beam to effect image plotting or tracing by the beam. Conventional electronic methods can be used to alter control signals applied to coil 30 to correct the beam deflection and thereby compensate for known geometric distortions in a recording surface such as a curved electron sensitive film 32. In this manner the desired information image is produced on the film.

The vacuum volume 18 provided by stage B, provides additional space in which to accommodate the deflected particle beam produced by the gun 22. The vacuum volume 20 provided by stage C, contains a film transport gate mechanism generally indicated at 33 and a film gate indicated generally at 34, illustrated in more detail in FIGS. 2 and 10. The film gate 34 is between the higher vacuum volume 18 and the lower vacuum 20 and is constructed and arranged to accurately position a charged particle sensitive recording means such as an electron sensitive emulsion coated film 32 in predetermined relation to the particle gun 22. The film, 32 can be a conventional type such as that available from the Eastman Kodak Co. under the designation SO 219. The film gate transport means 33, advances the film from the lower vacuum volume 20 into the film gate 34 and the higher vacuum volume 18.

The film 32, before exposure to the electron beam is in contact with platen 38. The platen 38, in the preferred embodiment of this invention, provides a convex curved film receiving surface (as viewed from the electron beam emitter), and a predetermined tension can be applied to the recording film 32 disposed on the platen 38 to assure a positive contact between the film 32 and the platen 38. In this manner, some of the positional uncertainties in the recording film are eliminated. Other uncertainties in recording and displaying of the film 32 are alleviated through use of referencing means as will be described hereinafter.

An electron beam striking the film 32, causes a latent image formation in the film, which, with further conventional chemical treatment, can be developed to produce a desired information image.

As will be recognized by one skilled in the art, electron beam recording is particularly suited to high resolution, photography such as satellite or scanner data displays where a large number of high quality pictures are produced at electronic speeds. Computer controlled EBR recording systems offer particular advantages for the study and investigation of hydrology, geology, ecology, agriculture, meteorology, cartography, and land use. Particular EBR systems can provide data handling capacities for (1) high image throughout (2) on-line corrections of geometric and radiometric errors caused by the sensor and satellite position (3) on-line annotating and framing of the continuous stream sensor data; (4) high image resolution and dynamic range. Moreover, EBR systems can provide dramatic time and cost reductions associated with eliminating the need to reformat the raw sensor data for each image to obtain a radiometrically and geometrically corrected image. EBR systems are also useful for automated cartography to produce map products by the various recording techniques such as vector plotting, names and text compositions, or raster scanning. Image formats can be varied depending upon the film size and film transport used. Additionally, EBR recording provides total composition and plotting capabilities compatible with a particular source or a mixture of sources to enable the production of high energy quality graphics such as line work, alphanumerics, symbols/trademarks, or graphic arts quality type. Almost any film format can be utilized with a micrographics EBR for such film recording applications as micropublishing, business data computer output micrographics (COM), engineering drawings and seismic data display.

Current performance levels of the micrographics EBR system indicated that the system could be readily adapted for electronic composition and recording of textbooks, magazines, or manuals on film. Text, halftones and graphics can be commingled electronically on a film sheet. The film sheet can then be enlarged to produce a printing plate for use with conventional printing presses.

In various embodiments of the present invention, it is desirable to provide the film gate 34 with referencing means for making reference holes in a film 32 disposed therein in order than an image may be recorded or displayed relative thereto. Advantageously, the reference holes are established after the film 32 has been stationarily positioned within the film gate 34 but prior to imaging of the film 32.

Referring now to FIG. 2 (a top view of the film gate 34), in conjunction with FIG. 1, a preferred embodiment of a referencing means 39 is illustrated to comprise two punches 40. Punches 40 are operated by drive arms 42 having a first end 44 pivotally connected thereto and a second end 46 linked to a peg 48 extending from and positioned off-center in the end of motor driven cam 50. The punches 40 are slidably seated in guide means 52 and are reciprocated therein by the action of the drive arms 42 which are connected off-center to, and driven by, the cams 50.

The guide means 52 extend through and between the film platen 38 and the film frame 36, and film 32 is positioned between the forward surface 56 of the platen 38 and the rear surface 58 of the film frame 36. The film 32 thereby interrupts the path defined by the guide means 52, which movements in a referencing mode of operation, include moving punches 40 forward in the guide means 52 from the film platen 38 into the film frame 36 thereby piercing the film 32 disposed transversely in the path of the guide means.

The punches 40 cut holes in the film substrate 32. The cut holes have perimeters which approximate the exterior configuration of the punches 40. It is particularly within the scope of this invention, to employ punches 40 having different exterior configurations, as will be discussed below, in conjunction with FIGS. 4, 5, 6, and 7 which represent alternate preferred embodiments of the referencing means 39 of the invention.

An interlock circuit (not shown) can be advantageously provided to intermittently activate the cam drive motor to rotate the cams 50 180° thereby alternately projecting and retracting the punches 40. In a preferred embodiment, the interlock circuit retracts the punches 40 to permit advancement of the film 32 and projects the punches 40 after fresh film has been advanced into exposure position within the film gate 34. The punches 40 remain in their projected position during exposure of the film 32 and in that manner contribute to the secure, defined, and stationary position of the film during exposure.

As will be recognized by one skilled in the art, the recorder system interlock circuit can also advantageously control the film transport means 33 to intermittently advance the film and to deactivate the transport means 33 during film exposure. Thus, the possibility of inadvertent movement of the film 32 during exposures is avoided. As disclosed above and in the above-referenced prior applications, the film 32 can be tensioned in the gate 34 to conform more uniformly to the platen surface. The extended or projected punches 40 of the present invention advantageously act to avoid inadvertent film movement caused by tensioning the film 32 during exposure.

FIG. 3 illustrates the prior art referencing means provided by the inventor. Round registration holes 70 and 71 are uniform i.e. they are identical in shape and size. The two reference holes 70 and 71 are of standard size and are designed to snugly fit over pegs 78 and 80. When punched, holes 70 and 71 may be exactly nine inches apart. After processing and handling for development of the image, however, film 32 may have expanded or contracted by on the order of 0.1%. Thus, when reference hole 70 is placed on peg 78, hole 71 does not properly align with peg 80 which was exactly nine inches from peg 78. If film 32 had expanded by 0.1%, hole 71 and peg 80 would be misaligned by approximately 1/100 of an inch resulting in the buckling of the film and distortion of the film image. If film 32 had expanded by 0.1% the misalignment would be equivalent. Film 32 would have to stretched with a resulting distortion of the image, or possible destruction of the hole and film by tearing.

Figure 4:
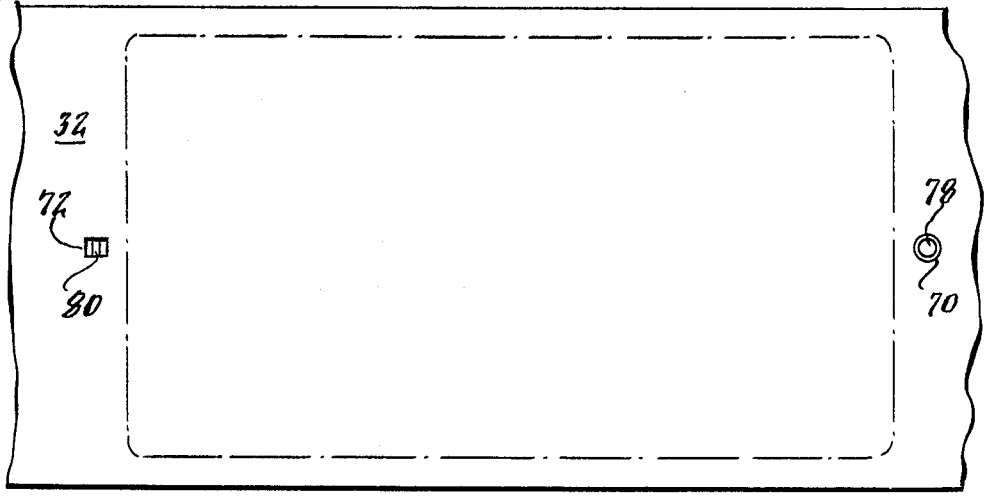
FIG. 4 is a plan view of a film with a standard size round reference hole and a second square reference hole located at the opposite end of the image field.
Figure 5:
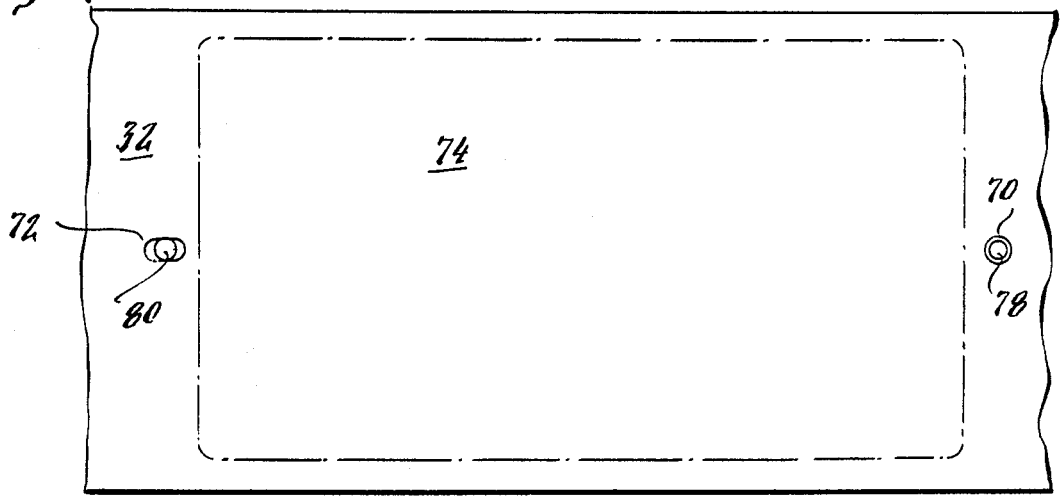
FIG. 5 is a plan view of a film with a first standard size reference hole and a second elongated reference hole.

FIGS. 4, 5, and 6 in conjuncton with FIGS. 1 and 2, illustrate alternate preferred embodiments of the present invention in which the referencing means 39, by alternate punch configurations, have made holes in film 32 with different registration configurations.

First and second punches 40 are employed to make a first standard size hole 70 having a diameter of approximately 0.25 inches and a second hole 72 of a different shape. During exposure the first and second punches 40 remain positioned through the film to securely position the film 32. During display, the first and second reference holes can be positioned on first and second pegs 78 and 80. Said first peg is of approximately the same diameter as first punch 40, and thus hole 70 snugly fits peg 78. Said second peg 80 is typically of the same vertical length as the second punch but has a horizontal length smaller than that of hole 80, thus accommodating the expansion or contraction of the film in the horizontal direction. An expansion or contraction of approximately 0.1% therefore does not interfere with the display of film 32. For example, if film 32 expanded by 0.1% film 32 would be displayed by snugly fitting reference hole 70 over standard sized peg 78. If pegs 78 and 80 are 9 inches apart, hole 72 will be mislocated by approximately 9/1000 inch. As the horizontal length of hole 72 is larger than peg 80, the larger length accommodates this expansion. Meanwhile, in the vertical direction the expansion is negligible and thus peg 80 sits snugly in hole 72. Thus, in sharp contrast to the inventor's prior art shown in FIG. 3, buckling of the film and the resulting injury to the film image is avoided, and a means is provided for positioning exposed film frames in relation to one another. In this manner, positional uncertainty during display, a serious limitation to accuracy in high performance EBR systems, is eliminated.

Further as illustrated in FIGS. 4 and 5, punches 40 may be of different shapes to form second hole 72. In FIG. 4, hole 72 is of a generally square shape. Second peg 80 in this embodiment is generally rectangular in cross section with a vertical length the same as hole 72 but with a shorter horizontal length than hole 72 to accommodate expansion or contraction of film 32. Likewise, in FIG. 5, hole 72 is somewhat elongated in shape with flattened sides. Second peg 80, may be circular, rectangular or of another shape as long as the vertical length of the peg 80 approximates the size and fits snugly in the elongated hole 72, and the horizontal length permits horizontal accommodation.

In FIG. 6, three reference holes are provided and two or three display pegs are required for proper positioning. First hole 70 is of standard size and shape, and second and third holes 72 are provided to properly accommodate film expansion and contraction. The registration holes in FIGS. 4, 5, and 6 are arranged about the periphery of the film to provide a referencing system which will not permit a film to be reversibly positioned therein. Particularly, second holes 72 and standard round punch holes 70 can be positioned in a desired pattern to effect a non-reversible film image reference system.

FIG. 7 also illustrates an alternate preferred embodiment of the invention wherein a registration hole 70 has been punched through film 32 to permit defined referencing of the film during both exposure and display. In the embodiment of FIG. 7, the film is also positioned by edge guides 62 and 64 at least one of which can be mechanically biased by, for example, a compressible spring 66 coiled about a shaft 68 fixedly mounted at one end to the guide and slidably associated on the other end into the film platen 38. Accordingly the reference hole 70 fixes the horizontal position of the film, and the guide means 62 and 64, in combination with the reference hole 70 fix the vertical positin of the film.

It will be noted, with particular reference to FIG. 7, that expansions or contractions of the film substrate, in the order of 0.1% or so, can be easily accommodated. The diameter of mark 60 is not significantly changed by a film contraction of 0.1% and the mark 60 will receive a display peg of substantially the same diameter as punch 40. The guide means, being open ended for horizontal positioning readily accommodates horizontal expansions of the film. The referencing means 39 including a hole punch 40 in combination with guide means 62 and 64 provides a system for accurately positioning the film for both display and exposure.

With respect to FIGS. 4, 5, 6 and 7, it should be recognized that besides providing embodiments which accommodate expansions and contractions of the film substrate without the resulting injury to the film upon display, the embodiments also permit exposed and developed films to be perfectly aligned relative to one another for superimposition. Registration hole 70 establishes a defined position for the film upon display, as the film 32 is in a predefined position in the film gate 34 during exposure, and punch 40 cuts hole 70 in a predefined position. By placing two films with respective holes 70 on peg 78, the films are thereby perfectly aligned for superimposition. Second holes 72 accommodate for the expansion or contraction of the film 32 and properly align on peg 80.

The invention similarly permits a developed film image to be projected and precisely located on a calibration reference image such as a defined reference grid. Thus a grid image which had been recorded on film 32 can be accurately superimposed on a defined reference grid before projection onto a screen, or film 32 may be projected onto a defined reference grid. These techniques permit accurate measurement of the geometric fidelity of the recorded image.

Referring now to FIGS. 8, 9, and 10 in conjunction with FIGS. 1 and 2, it will be seen that the film frame 36 can advantageously be provided with a magazine 90 for collecting the pieces of film removed by the punches 40 from film 32. As discussed in connection with FIG. 1, EBR recording is performed in a vacuum atmosphere to avoid extraneous interference with the beam. Accordingly the magazine 90 receives the pieces of punched film 32 and thereby avoids the otherwise possible contamination of the EBR vacuum with cut plastic pieces. The front face of the film frame 36 which contains the magazine 90 can be provided with a removable magazine cover plate 92 which enables the cleaning of the cut film pieces from the film frame magazine 90.

It should be understood that the preferred embodiments described herein are only intended to be illustrative of the present invention. It will be appreciated that the present invention provides an improved and practical charged particle beam recording system. Although the system has been described with particular reference to electron beam recording, it is readily apparent that the improved gate and system of the present invention may be used in combination with a variety of different charged particle producing devices including those which produce protons and ions. Those skilled in the art will further recognize that different types of punches are suitable for this invention.

Further, while the invention has been described in its preferred form with a certain degree of particularity, it is understood that the present disclosure of the preferred embodiment is made by way of example and that modification in the details of construction may be resorted to without departing from the true spirit and scope of this invention. It is intended that the patent shall cover, by suitable expression in the appended claims, whatever features of patentable novelty exist in the invention disclosed.

What is claimed is:

1. In a charged particle beam recorder system having a controllable beam source of charged particles, a film gate for disposition of a film in predetermined relation therewith, and a curved platen which is convex in relation to said beam source, said film gate further comprising reference means for creating at least two reference holes of different shapes in a film disposed in said film gate, said holes for permitting said film after expansion, development and handling to be accurately positioned for display.

2. The charged particle beam recorder system of claim 1 further including a vacuum housing wherein said film gate is located in a vacuum atmosphere produced by said vacuum housing.

3. The charged particle beam recorder system of claim 1 wherein each of said reference means includes a punch activatable by a motor driven cam.

4. The charge particle beam recorder system of claim 3 wherein the reference means includes an interlock system for disabling said motor driven cam during film exposure.

5. The charged particle beam recorder system of claim 4 further including a motor driven film transport mechanism wherein said interlock system further disables said film transport mechanism during film exposure.

6. The charged particle beam recorder system of claim 2 further comprising a magazine for collecting pieces of film removed by said reference means.

7. In a charged particle beam recorder system having a controllable beam source of charged particles, a film gate for disposition of a film in predetermined relation therewith, and a curved platen which is convex in relation to said beam source, said film gate further comprising a reference means for creating a reference hole in a film disposed in said film gate, said reference hole to be used in conjunction with guide means for accurately positioning said film for display.

8. In a method of charged particle beam recording comprising the steps of positionally disposing a film relative to a source of a charged particle beam, and exposing said film by said beam, the invention comprising an additional step of piercing said film with at least two punches of different shapes to establish reference holes in said film for positioning said film relative to said beam just prior to beam exposure and using said punched shapes subsequently for display of the recorded image of said exposure.

9. The method of claim 8 comprising the additional steps of providing a vacuum atmosphere for said film and said beam; and collecting in a magazine the pieces of film removed by said punch in establishing reference holes.

10. In a method of charged particle beam recording comprising steps of positionally disposing a film relative to a source of a charged particle beam, and exposing said film by said beam, the additional step of piercing said film by a punch after such disposing and just prior to beam exposure to establish a reference hole in said film, which hole, in conjunction with guide means, can be used to accurately position film relative to the beam prior to beam exposure and subsequently for display.

* * * * *